(12) United States Patent
Lai et al.

(10) Patent No.: US 10,701,261 B2
(45) Date of Patent: Jun. 30, 2020

(54) METHOD, SYSTEM AND COMPUTER PROGRAM PRODUCT FOR SELECTIVE IMAGE CAPTURE

(71) Applicant: International Business Machines Corporation, Armonk, NY (US)

(72) Inventors: Jui-Hsin Lai, White Plains, NY (US); Ching-Yung Lin, Scarsdale, NY (US); Wan-Yi Lin, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 15/224,851

(22) Filed: Aug. 1, 2016

(65) Prior Publication Data

US 2018/0035045 A1 Feb. 1, 2018

(51) Int. Cl.
*H04N 5/228* (2006.01)
*H04N 5/232* (2006.01)
*G06K 9/00* (2006.01)

(52) U.S. Cl.
CPC ..... *H04N 5/23222* (2013.01); *G06K 9/00456* (2013.01); *H04N 5/232* (2013.01); *H04N 5/23293* (2013.01); *G06K 2209/01* (2013.01); *G06K 2209/25* (2013.01); *H04N 5/23216* (2013.01); *H04N 5/23258* (2013.01)

(58) Field of Classification Search
CPC .................................................. H04N 5/23222
USPC ...................................................... 348/222.1
See application file for complete search history.

(56) References Cited

U.S. PATENT DOCUMENTS

| | | | |
|---|---|---|---|
| 6,473,523 B1 | 10/2002 | Newman et al. | |
| 6,738,572 B2 | 5/2004 | Hunter | |
| 7,053,939 B2 | 5/2006 | Lin et al. | |
| 7,272,403 B2 | 9/2007 | Creamer et al. | |
| 8,787,941 B2 | 7/2014 | Kushtagi et al. | |
| 9,165,186 B1 | 10/2015 | Ramos et al. | |
| 9,223,986 B2 | 12/2015 | Ashok et al. | |
| 9,298,981 B1 | 3/2016 | Ragnet et al. | |
| 2003/0126267 A1* | 7/2003 | Gutta ................ G06F 17/30867 709/229 |
| 2005/0075117 A1 | 4/2005 | Jang | |
| 2005/0192038 A1* | 9/2005 | Jeong ........................ H04B 1/38 455/513 |

(Continued)

FOREIGN PATENT DOCUMENTS

TW 201118757 A 6/2011

*Primary Examiner* — Usman A Khan
(74) *Attorney, Agent, or Firm* — Harrington & Smith

(57) ABSTRACT

A method includes analyzing a preview image made by an image sensor when operating in a preview image mode to determine if the preview image contains some portion that corresponds to information that is considered not subject to being imaged. The method further includes, if it is determined that the preview image does comprise some image portion that corresponds to information that is considered not subject to being imaged, disabling the image sensor from capturing an image that would correspond to the preview image. Analyzing can include accessing a data storage that contains representations of information that is considered not subject to being imaged for comparison with image features extracted from the preview image, where the data storage is at least one of contained in a device that also contains the image sensor, or is located remotely from the device and can be accessed via a wireless connection.

20 Claims, 5 Drawing Sheets

(56) References Cited

U.S. PATENT DOCUMENTS

| | | |
|---|---|---|
| 2007/0129012 A1 | 6/2007 | Snow |
| 2008/0012935 A1 | 1/2008 | Echtenkamp |
| 2013/0283388 A1* | 10/2013 | Ashok .................. G06F 21/60 726/26 |
| 2014/0192210 A1* | 7/2014 | Gervautz ............... G06K 9/228 348/207.1 |
| 2015/0172603 A1 | 6/2015 | Gorodetski et al. |
| 2016/0028878 A1 | 1/2016 | Davis et al. |
| 2017/0212658 A1* | 7/2017 | Shimizu ................. G06F 3/048 |

* cited by examiner

METHOD, SYSTEM AND COMPUTER PROGRAM PRODUCT FOR SELECTIVE IMAGE CAPTURE

STATEMENT OF GOVERNMENT RIGHTS

This invention was made with Government support under Contract No.: D15PC00161 awarded by the Department of Homeland Security. The Government has certain rights in this invention.

TECHNICAL FIELD

Embodiments of this invention pertain to systems and methods to protect confidential information from unauthorized access and distribution and also relate to portable consumer devices that are embodied as, or that contain, an imaging device such as a digital camera.

BACKGROUND

Mobile consumer devices containing at least one camera (e.g., smartphones, tablets) have become ubiquitous. A problem that arises relates to controlling access to confidential information such as information contained in physical documents or otherwise tangibly embodied in a form that is amenable to being photographed. Using a conventional camera-containing mobile device an unauthorized person could readily capture an image that contains the confidential information and can then subsequently electronically distribute and/or reproduce the captured images(s).

SUMMARY

In a first aspect thereof the embodiments of this invention provide a method that comprises analyzing a preview image made by an image sensor when operating in a preview image mode to determine if the preview image comprises some portion that corresponds to information that is considered not subject to being imaged. The method further comprises, if it is determined that the preview image does comprise some image portion that corresponds to information that is considered not subject to being imaged, disabling the image sensor from capturing an image that would correspond to the preview image.

In a further aspect thereof the embodiments of this invention provide a system comprised of at least one data processor connected with at least one memory that stores software instructions and with an image sensor. Execution of the software instructions by the at least one data processor causes the system to analyze a preview image made by the image sensor when operating in a preview image mode to determine if the preview image comprises some portion that corresponds to information that is considered not subject to being imaged and, if it is determined that the preview image does comprise some image portion that corresponds to information that is considered not subject to being imaged, disable the image sensor from capturing an image that would correspond to the preview image.

In another aspect thereof the embodiments of this invention provide a computer program product comprised of software instructions on a computer-readable medium, where execution of the software instructions using a computer results in performing operations comprising analyzing a preview image made by an image sensor when operating in a preview image mode to determine if the preview image comprises some portion that corresponds to information that is considered not subject to being imaged and, if it is determined that the preview image does comprise some image portion that corresponds to information that is considered not subject to being imaged, disabling the image sensor from capturing an image that would correspond to the preview image.

DETAILED DESCRIPTION

Figure 1:
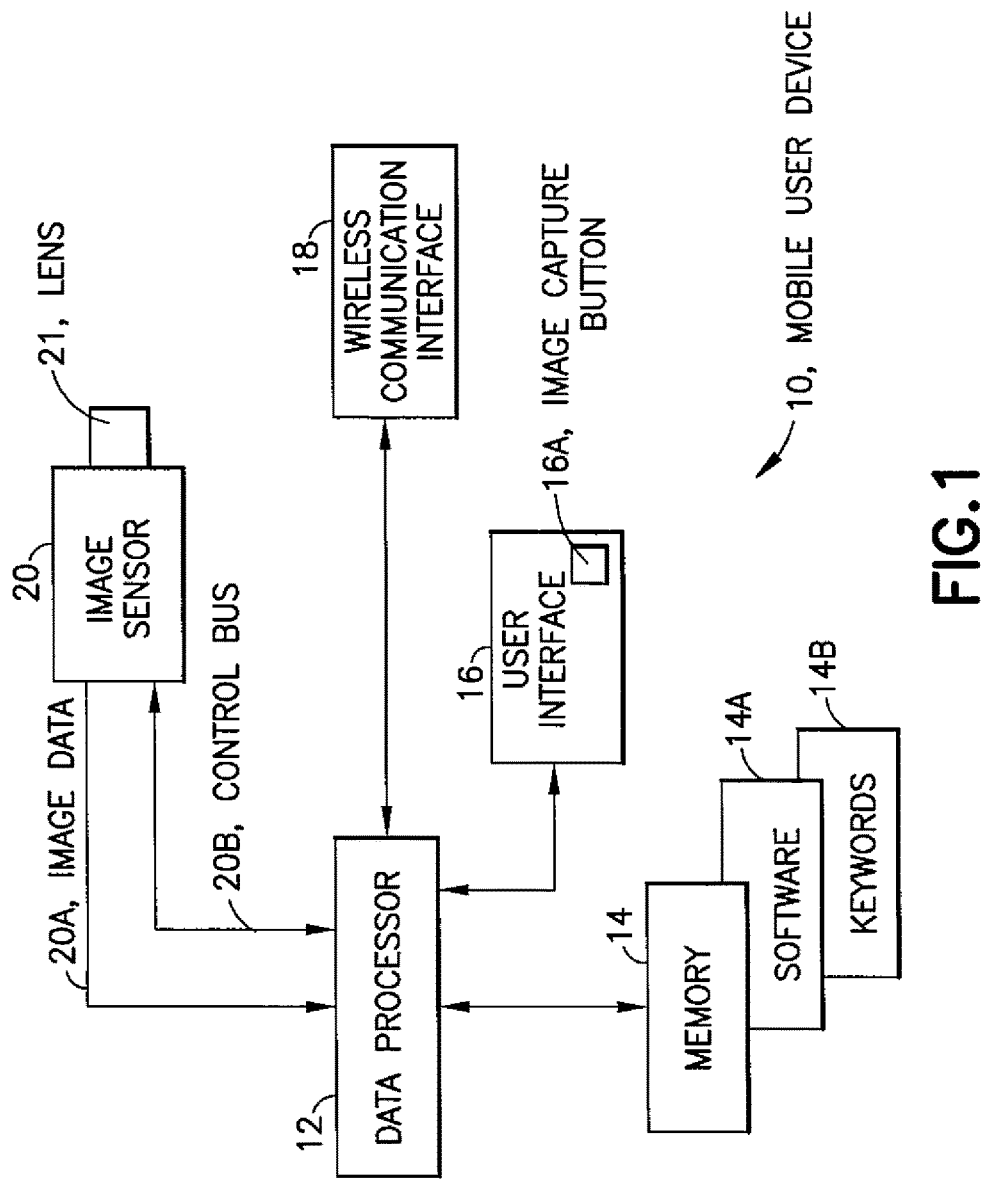
FIG. 1 is a block diagram of a system embodied as a mobile user device that is suitable for use in implementing and practicing the embodiments of this invention.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Preventing an unauthorized information leak from a mobile device having image capture capabilities is a challenge faced by many organizations and enterprises. The organizations and enterprises can be private, for-profit, not-for-profit and governmental. The problem exists for a wide variety of information that can be considered by a particular organization/enterprise to be sensitive and/or confidential such as, but not limited to, documents, spreadsheets, invoices, engineering drawings, chemical formulations, models and depictions of structures, machines and products as well the structures, machines and products themselves. One conventional approach can simply include instituting a policy that forbids the use or possession of personal mobile devices within some defined area. However this and other conventional approaches can be difficult to implement and/or enforce in many practical environments.

The exemplary embodiments of this invention provide in one aspect thereof a method, system and computer program code that address and solve these conventional problems by analyzing an image made by an imaging device when operating in a pre-image capture mode, e.g., a preview image made by a camera embodied in a user communication device, prior to an actual image capture mode being triggered. If the analysis indicates a presence or a potential presence of some confidential information in the preview image then the actual image capture mode can be disabled. The analysis can be performed by software that runs as a background task in the user communication device to analyze preview images. In one exemplary embodiment the software can be responsive to the preview image containing text and/or some graphical content that has been explicitly defined as being confidential or classified or proprietary. In another exemplary embodiment the software can be responsive to a presence of text in the preview image that contains one or more certain key words/phrases that are deemed to possibly indicate a presence of confidential or classified or proprietary content. The certain key words can include words such as, as non-limiting examples, "confidential" or "secret" or "classified", etc. The certain key phrases can include, as non-limiting examples, phrases such as "sales forecast", "product development", "limited distribution", "company private", "not for release", etc. In some cases the analysis can determine that a preview image contains some predetermined confidential graphical pattern that could in some cases represent a logo. In some embodiments the analysis can determine that a preview image is of some scene, e.g., an interior view of a factory that is deemed to be private or confidential.

For the purposes of describing the embodiments of this invention references to, as several non-limiting examples: "confidential", "secret", "proprietary", "classified", "not for release", "company private", etc., can be considered as pertaining to some information embodied as, e.g., a document, a three dimensional structure, a scene, etc., that is considered to not be subject to being imaged by a person that is not authorized by an owner or controller of the information to create an image that contains the information.

FIG. 1 is a block diagram of a system, such as a mobile user device 10, suitable for use in implementing and practicing the embodiments of this invention. The mobile user device 10 could be embodied, as several non-limiting examples, as a smartphone, or a tablet computer, or as a laptop computer. The mobile user device 10 includes at least one controller/data processor 12 connected with at least one memory 14 that stores software (SW) 14A. The software 14A can include those programs and applications that are desirable to run to perform inhibiting and disabling image capture in accordance with embodiments of this invention. Also connected with the at least one controller/data processor 12 may be at least one user interface 16 that could be embodied as a graphical user interface (GUI) that enables a user of the mobile user device 10 to enter data into the mobile user device 10 and control the operation of the mobile user device 10, including initiating image capture operations. Also connected with the at least one controller/ data processor 12 may be at least one wireless communication interface 18 that could be embodied as and contain one or more of a radio frequency (RF) cellular interface, an IEEE 802.11 compatible (WiFi) interface, a Bluetooth interface and a near field communication (NFC) interface as non-limiting examples. A wired interface to a network or networks, e.g., via a cable, can also be provided.

Also connected to the data processor 12 in the embodiment of FIG. 1 is at least one image sensor 20, e.g., a digital camera capable of capturing still and/or video/motion images. The image sensor 20 may be assumed to include some type of lens 21 through which light enters. The image sensor 20 is capable of outputting image data 20A to the controller/data processor 12. A control bus 20B can be provided between the controller/data processor 12 and the image sensor 20 by which the image sensor 20 is activated/ deactivated and through which an image capture command and other commands can be conveyed. In some embodiments the image sensor 20 forms a part of and is integrated into the structure/package of the mobile user device 10. In some embodiments the mobile user device 10 could be a camera, while in other embodiments the mobile user device 10 can include a camera in conjunction with other functionalities such as, by example, one or more of a phone, a browser and an electronic mail (email) and/or text messaging system.

If the mobile user device 10 lacks a dedicated 'hard' image capture button/switch, in operation the user interface 16 can display one or more virtual 'soft' buttons 16A that when actuated by the user initiate image capture by the image sensor 20. The image capture process can be, for example, a multi-step process including an initial image preview mode that is initiated by the user first depressing/ touching the shutter actuating button 16A, followed by an image capture mode initiated by the user, e.g., continuing to depress/touch the shutter actuating button 16A. During the initial image preview mode a preview image obtained from the image data 20A can be displayed enabling the user to see what a corresponding final captured image will look like thereby enabling the user to determine, for example, if the image will be properly focused and framed.

Figure 2:
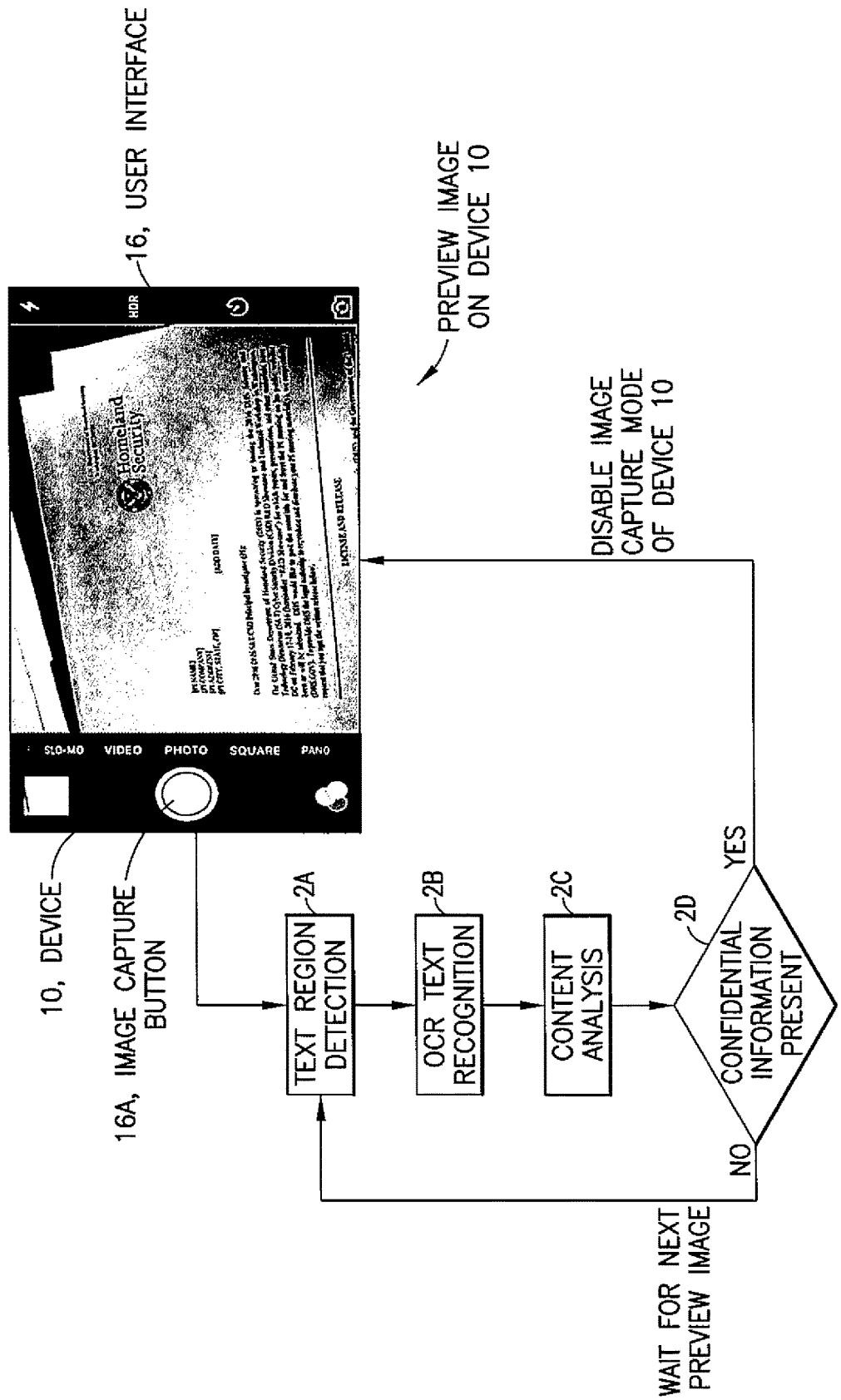
FIG. 2 illustrates an exemplary process flow for image analysis and text detection and processing on the mobile user device shown in FIG. 1.

FIG. 2 illustrates an exemplary process flow for image analysis on the mobile user device 10. The process flow is one performed by the controller/data processor 12 in cooperation with the memory 14 and the stored SW 14A. In the example of FIG. 2 there is a preview image displayed on the user interface 16 that resulted from the user activating the image capture button 16A. In this example the preview image happens to be one that comprises pages of a document. The SW 14A operates by analyzing at Block 2A the preview image data to detect if the preview image contains image data corresponding to text. This can involve an image gradient extraction process to scale down an extracted gradient map, calculate the gradient distribution and highlight a region with directive distributions (corresponding to the presence of text). Assuming that a text region is located (if not the process stops unless some other detection process is initiated, e.g., one selective to graphical patterns) then an optical character recognition (OCR) process is performed at Block 2B to identify and recognize the located text. This can involve normalizing the text region detected in Block 2A to a rectangle-shape with a fixed height, accumulating a histogram of gradient distribution on an X-axis, separating characters from the text region by use of a discrete distribution, and applying OCR recognition on a single character (character-by-character). At Block 2C a content analysis process is performed to determine if the recognized text includes text that would correspond to what would be considered as confidential information. This can include building up a lookup table (LUT) for key words/phrases (see the library 22 of FIG. 4). This can also include checking the recognized text against a list or lists of key words and key phrases (possibly stored in the library 22) as was discussed above. Natural language processing can also be employed for processing the recognized text to derive the meaning/ reasoning of sentences as an aid in determining if any confidential content is present.

At Block 2D a determination is made if the imaged and recognized text in the preview image contains any text that would qualify as confidential (or classified, or secret, or proprietary, or sensitive, e.g.) information. If the determination is negative (No) the process returns to Block 2A to simply wait for another preview image to be generated, thereby enabling the imaging system to operate normally and complete the image capture mode. However, if the presence of confidential information is indicated in the preview image then the process disables the image capture mode of the device 10 thereby preventing a user of the device 10 from capturing and storing an image of, in this example, the document page or pages. This can be accomplished, for example, by preventing the generation of an image capture signal or the transmission of an image capture signal over the control bus 20B from the controller/data processor 12 to the image sensor 20. In other embodiments the image sensor 20 can instead be controlled so that even if the image is captured the image data 20A is not transmitted from the image sensor 20 and thus is not received and stored by the controller/data processor 12. In other embodiments the device 10 can instead be controlled so that even if the image is captured and the image data 20A is transmitted from the image sensor 20 to the controller/data processor 12 the image data 20A is not stored or otherwise recorded by the controller/data processor 20A, resulting in the image data 20A being effectively erased/deleted. For the purposes of describing embodiments of this invention all of these various techniques can be considered as being equivalent to disabling the image sensor 20 from capturing an image that would correspond to the preview image.

Figure 3:
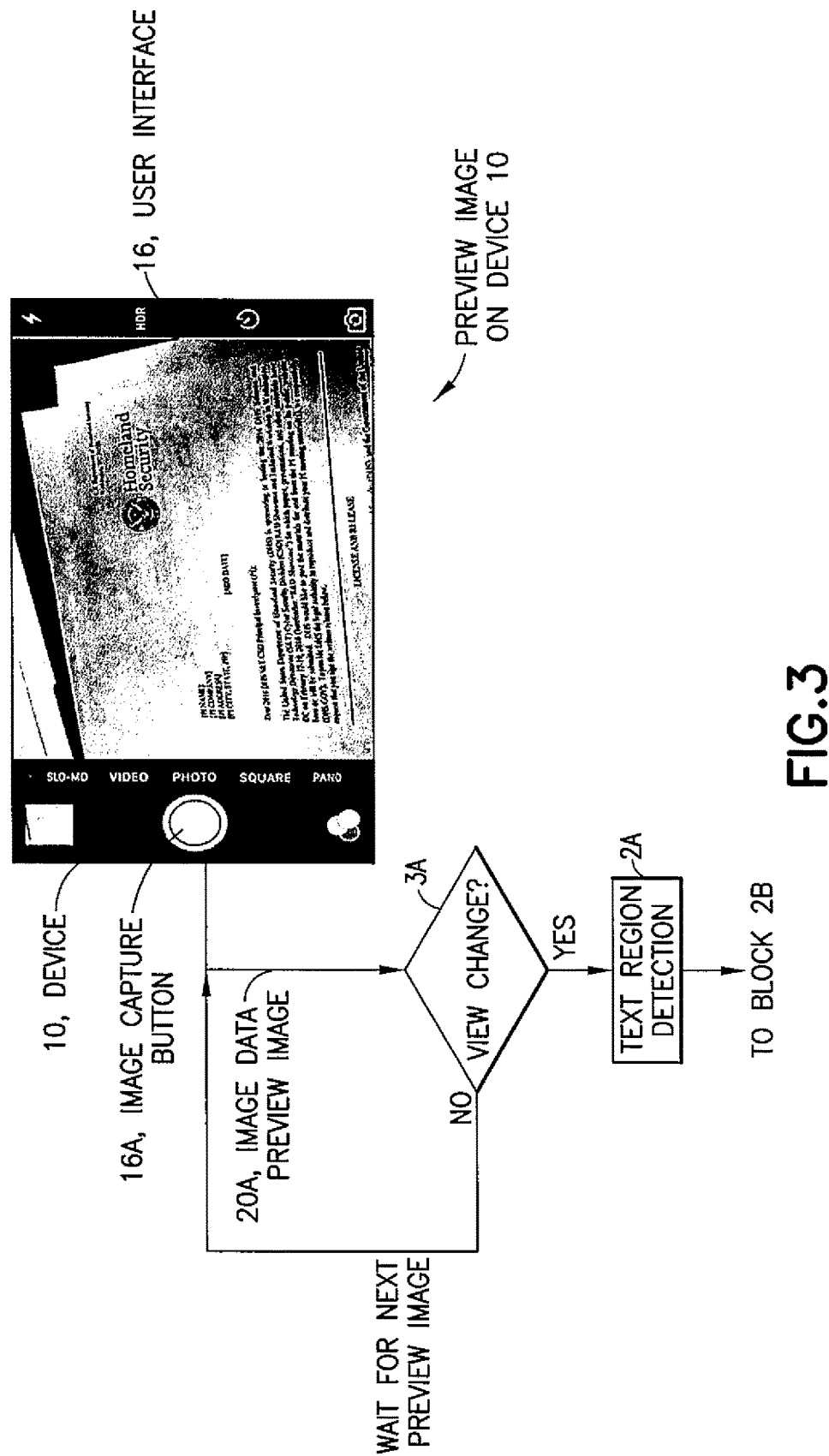
FIG. 3 shows a portion of the logic flow diagram of FIG. 2 and includes a view change testing step/process.

FIG. 3 shows a portion of the logic flow diagram of FIG. 2 and includes a view change testing step/process 3A. In this step, assuming the presence of a preview image at the output of the image sensor 20, the software 14A attempts to detect motion of the mobile user device 10 by analyzing any appropriate onboard motion sensors including, for example, gyroscope or accelerometer signals. Motion is recognized if there is a change in the sensor signals and the view change test is satisfied (Yes branch) indicating that motion of the mobile user device 10 has occurred. In this case, program flow proceeds to Block 2A to perform the text region detection. If motion is not detected (No branch) software 14A iterates until motion is detected and there is a preview image. In general if there is a preview image present, and if motion of the device 10 has occurred, then it may be assumed that the content of the preview image has changed since the lens 21 of the image sensor 20 may now be pointed in a different direction.

Figure 4:
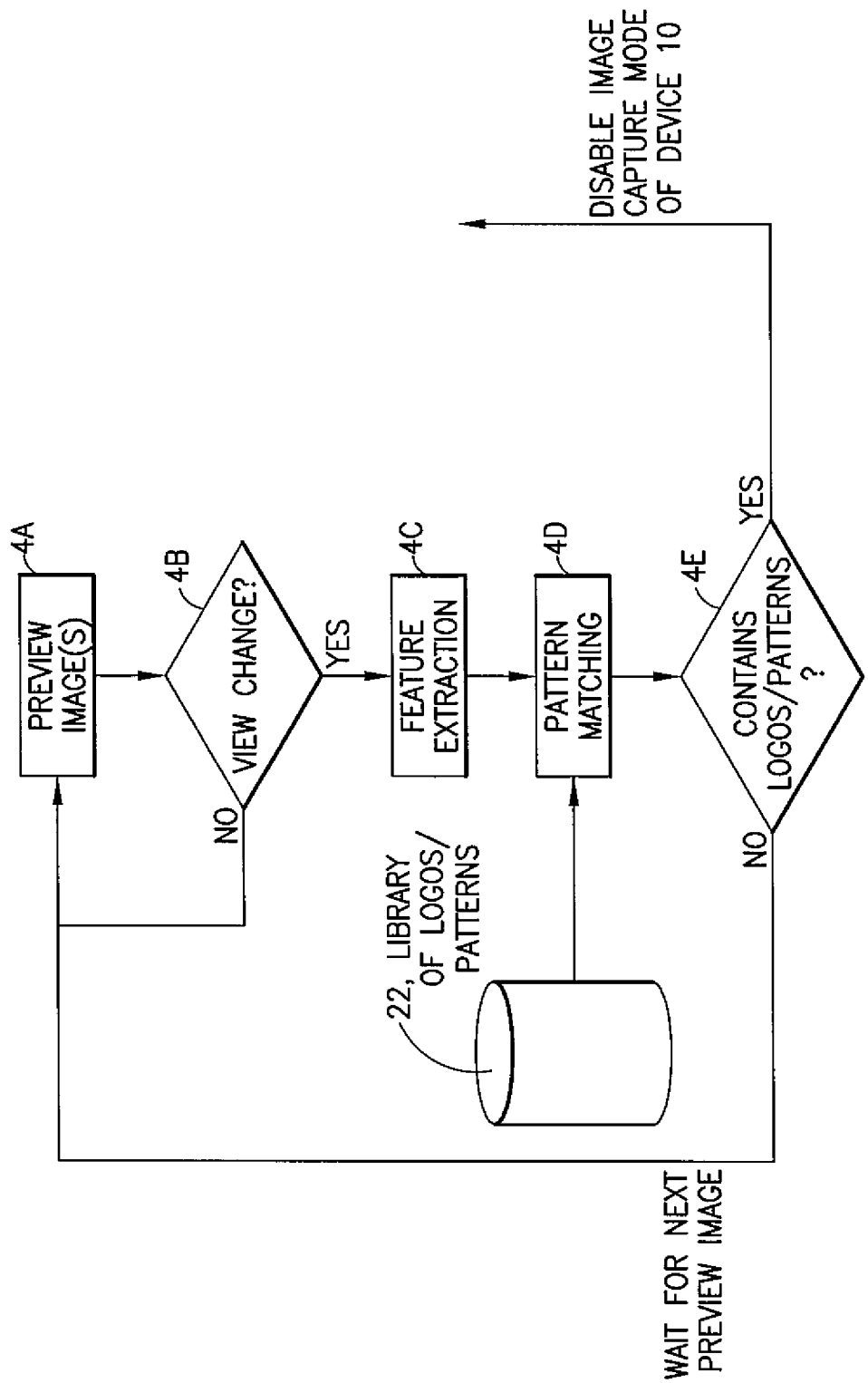
FIG. 4 is a logic flow diagram that illustrates an embodiment of this invention that is directed to the detection and processing of graphical information, such as logos/patterns, in the preview image data.

FIG. 4 is a logic flow diagram pertaining to the detection of graphical information (graphical pattern(s)) such as logos/patterns in the preview image data. The process begins with Blocks 4A (preview image(s)) and 4B (view change) as was described for FIG. 3. If a view change is detected at Block 4B the process proceeds to Block 4C to perform feature extraction from the preview image.

This step can entail extracting the gradient distribution of preview images to find key points and then performing key point extraction, e.g., using a SIFT approach. This refers to use of a scale-invariant feature transform (SIFT) that is an algorithm known in computer vision that can be used to detect and describe local features in images. Any extracted key points are then processed at Block 4D (pattern matching) to perform matching between extracted key point(s) and logos/patterns obtained from a library 22. The logos/patterns stored in the library 22 can include those that have been predetermined to be confidential/classified/secret/etc. and that are not to be imaged. If the processed preview image(s) are found to contain one or more logos/patterns that are also found in the library 22 (Block 4E) then an image capture by the mobile user device 10 is disabled, otherwise image capture can be allowed and the process iterates to process a next preview image.

It is noted that the library 22 can also be used with the text processing embodiments of FIGS. 2 and 3 to store words/phrases that have been predetermined to be confidential/classified/secret/etc. and that are not to be imaged.

It is further noted in this regard that the library 22 can be instantiated in the mobile user device 10, e.g., as a portion of the memory 14. Alternatively, or in addition to local storage, the library 22 can be instantiated external to the mobile user device 10 in some remote server (and/or in the cloud) and can be accessed via the wireless communications interface 18.

Note further in this regard that a particular organization/enterprise that wishes to implement the teachings of this invention can maintain/control the library 22 so as to contain their own specific words, phrases, logos, etc., that are deemed to define some information that is not to be imaged. When the mobile user device 10 is detected by any means (e.g., GPS, or RF signal strength, etc.) as being at or near a location controlled by the organization/enterprise then the software 14A accesses that library 22 to make comparisons between preview images and those predetermined words, phrases, logos, etc. stored in the library 22. When the mobile user device 10 is subsequently detected as being at or near a location controlled by another organization/enterprise then the software 14A accesses that particular library 22 to make comparisons between preview images and predetermined words, phrases, logos, etc. stored in that particular library 22.

In some embodiments the software 14A that implements this invention could be pre-loaded into the memory 14 on the mobile user device 10 along with at least one list of common words/phrases, etc., that are deemed to indicate a status of confidential/secret, etc. In some embodiments the content of the library 22 is always maintained at least in part external to the mobile user device 10. In some embodiments there are numerous libraries 22, each associated with a different organization/enterprise, that are used and consulted when the mobile user device 10 is in the vicinity of the organization/enterprise and when the user has initiated the taking of a preview image. In some embodiments one or both of the software 14A and the library 22 can be wirelessly uploaded and installed, via the wireless communications interface 16, by an organization/enterprise when it is detected that the mobile user device 10 is in the vicinity of the organization/enterprise. This can occur, for example, when a user of the mobile user device 10 transports the mobile user device 10 into a building such as a headquarters or a laboratory or a research facility associated with the organization/enterprise.

The embodiments of this invention thus pertain at least in part to image processing with pattern recognition, where the software 14A, in cooperation with the controller/data processor 12, operates by extracting features from preview images, e.g., SIFT features; by fetching image features from target patterns, e.g., a company logo, a confidential symbol; by conducting pattern recognition using extracted features; and disabling the image capture function of the mobile user device 10 when a preview image contains some confidential logo or pattern.

Figure 5:
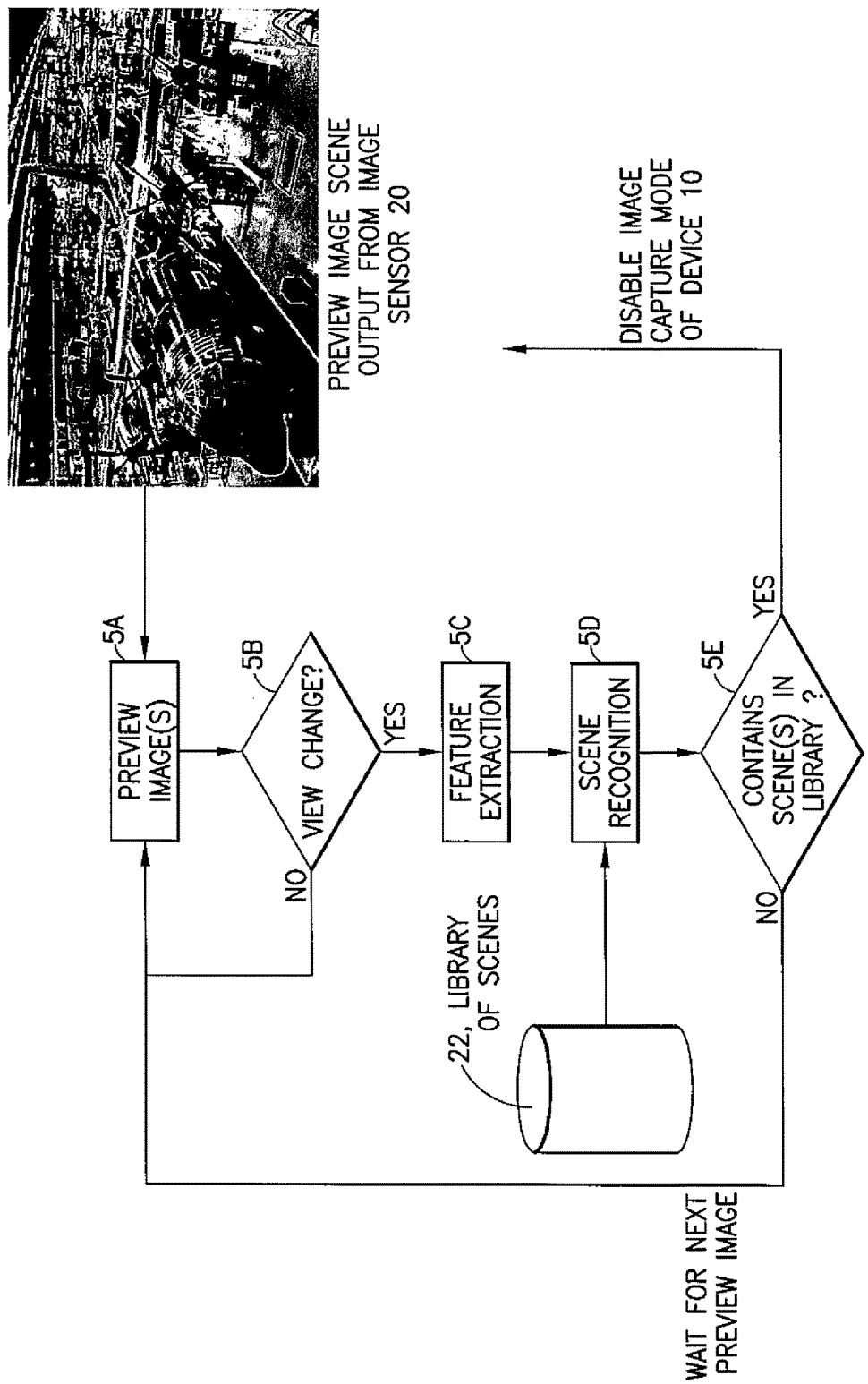
FIG. 5 illustrates an embodiment of a process flow in accordance with embodiments of this invention that combines image processing with scene recognition.

FIG. 5 illustrates an embodiment of a process flow that combines image processing with scene recognition. The scene could be an interior (indoor) scene or an exterior (outdoor) scene such as, for example, a view of a factory or a factory floor, a laboratory, a computer center, etc. As with FIG. 4 the process can begin with Blocks 5A (preview image(s)) and 5B (view change) as was described for FIG. 3. If a view change is detected at Block 5B the process proceeds to Block 5C to perform feature extraction from the preview image. This step can entail extracting, in one non-limiting example, features from the preview image using a convolution neuron network (CNN). The CNN is a known type of feed-forward artificial neural network in which a connectivity pattern between neurons is based on the organization of the animal visual cortex, where individual neurons are so arranged that they respond to overlapping regions that tile a visual field. Any extracted key points in this approach are then processed at Block 5D (pattern matching) to perform matching between extracted key point(s) and scenes/models of scenes obtained from the library 22. The training of at least some scene categories can be accomplished using, as one non-limiting example, a deep neural network (DNN), i.e., with an artificial neural network (ANN) with multiple hidden layers of units between the input and output layers. A DNN is capable of modeling complex non-linear relationships. One example of a suitable DNN tool is available from caffe.berkeleyvision.org. In any event the scenes and scene models stored in the library 22 can include those scenes and scene models that have been predetermined to be confidential/classified/secret/etc. and that are not to be imaged. If the processed preview image(s) are found to contain a scene also found in the library 22 (Block 5E) then an image capture by the image sensor 20 of the mobile user device 10 is disabled, otherwise image capture is allowed and the process iterates to process a next preview image.

Based on the foregoing description it should be apparent that embodiments of this invention provide a method, computer program product and structure configured to disable an image capture function of an image sensor by detecting if a preview image contains some image portion that corresponds to information that is considered not subject to being imaged. The image portion can include one or more of text, a graphical pattern, a logo or a scene.

For the non-limiting case of text, textual characters (e.g., letters, numbers, punctuation) can be extracted from a text region and OCR text recognition can be executed on the extracted textual characters and key word/phrase processing performed to find matches if they exist to a predetermined list/library of textual constructs such as words/phrases that are deemed to not be subject to being imaged. Machine learning can also be accomplished on the recognized text in an attempt to gain an understanding of the meaning of the text in the detected text region. If the preview image is found to contain some image portion that corresponds to information that is considered not subject to being imaged then an image capture function of the image sensor is disabled.

For the non-limiting cases of a pattern or a logo or a scene an appropriate pattern, logo or scene recognition algorithm is executed on a detected pattern, logo or scene region and processing is performed to find matches if they exist to a predetermined set of patterns, logos or scenes that are deemed to be not subject to being imaged. If the preview image is found to contain some image portion that corresponds to information that is considered not subject to being imaged then the image capture function of the image sensor is disabled.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signal per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As such, various modifications and adaptations may become apparent to those skilled in the relevant arts in view of the foregoing description, when read in conjunction with the accompanying drawings and the appended claims. As but some examples, the use of other similar or equivalent mathematical expressions may be used by those skilled in the art. However, all such and similar modifications of the teachings of this invention will still fall within the scope of this invention.

What is claimed is:

1. A method, comprising:
   actuating an image capture process for an image;
   displaying a preview image, made by an image sensor when operating in a preview image mode, based on the actuated image capture process;
   analyzing the displayed preview image to determine if the displayed preview image comprises some portion that corresponds to information that is considered not subject to being imaged; and
   if it is determined that the displayed preview image does comprise some image portion that corresponds to information that is considered not subject to being imaged, disabling the image sensor from capturing an image that would correspond to the displayed preview image;
   wherein analyzing the displayed preview image is based at least in part on a detection of a motion of the image sensor and includes extracting, mapping, and scaling the preview image to determine a gradient distribution.

2. The method as in claim 1, where the image portion comprises one or more of text, a graphical pattern, a logo or a scene.

3. The method as in claim 1, where the image portion comprises text, further comprising identifying a text region in the preview image, extracting textual characters from the text region, performing text recognition on the extracted textual characters, performing key word/phrase comparisons on recognized text to find a match, if present, to a predetermined list of words/phrases that are deemed to not be subject to being imaged and, if the preview image is found to contain some image portion that corresponds to information that is considered not subject to being imaged, disabling the image sensor from capturing an image that would contain the image portion containing text.

4. The method as in claim 1, where the image portion comprises a graphical pattern, further comprising identifying a region in the preview image that contains the graphical pattern, extracting the graphical pattern from the region, performing graphical comparisons on the extracted graphical pattern to find a match, if present, to a predetermined set of graphical patterns that are deemed to not be subject to being imaged and, if the preview image is found to contain some image portion that corresponds to information that is considered not subject to being imaged, disabling the image sensor from capturing an image that would contain the image portion containing the graphical pattern.

5. The method as in claim 1, where the image portion comprises a scene, further comprising identifying a region in the preview image that contains the scene, extracting the scene from the region, performing scene comparisons on the extracted scene to find a match, if present, to a predetermined set of scenes that are deemed to not be subject to being imaged and, if the preview image is found to contain some image portion that corresponds to information that is considered not subject to being imaged, disabling the image sensor from capturing an image that would contain the image portion containing the scene.

6. The method as in claim 1, where analyzing comprises accessing a data storage that contains representations of information that is considered not subject to being imaged for comparison with image features extracted from the preview image, where the data storage is at least one of:
  contained in a device that also contains the image sensor, or
  is located remotely from the device and is accessed via a wireless connection.

7. The method of claim 6, where the device is a mobile user device that comprises at least a camera.

8. A system comprised of at least one data processor connected with at least one memory that stores software instructions and with an image sensor, where execution of the software instructions by the at least one data processor causes the system to:
  actuate an image capture process for an image;
  display a preview image, made by an image sensor when operating in a preview image mode, based on the actuated image capture process;
  analyze the displayed preview image to determine if the displayed preview image comprises some portion that corresponds to information that is considered not subject to being imaged; and
  if it is determined that the displayed preview image does comprise some image portion that corresponds to information that is considered not subject to being imaged, disable the image sensor from capturing an image that would correspond to the displayed preview image;
  wherein analyzing the displayed preview image is based at least in part on a detection of a motion of the image sensor and includes extracting, mapping, and scaling the preview image to determine a gradient distribution.

9. The system as in claim 8, where the image portion comprises text, and where execution of the software instructions by the at least one data processor further causes the system to identify a text region in the preview image, extract textual characters from the text region, perform text recognition on the extracted textual characters, perform key word/phrase comparisons on recognized text to find a match, if present, to a predetermined list of words/phrases that are deemed to not be subject to being imaged and, if the preview image is found to contain some image portion that corresponds to information that is considered not subject to being imaged, to disable the image sensor from capturing an image that would contain the image portion containing text.

10. The system as in claim 8, where the image portion comprises a graphical pattern, and where execution of the software instructions by the at least one data processor further causes the system to identify a region in the preview image that contains the graphical pattern, extract the graphical pattern from the region, perform graphical comparisons on the extracted graphical pattern to find a match, if present, to a predetermined set of graphical patterns that are deemed to not be subject to being imaged and, if the preview image is found to contain some image portion that corresponds to information that is considered not subject to being imaged, to disable the image sensor from capturing an image that would contain the image portion containing the graphical pattern.

11. The system as in claim 8, where the image portion comprises a scene, and where execution of the software instructions by the at least one data processor further causes the system to identify a region in the preview image that contains the scene, extract the scene from the region, perform scene comparisons on the extracted scene to find a match, if present, to a predetermined set of scenes that are deemed to not be subject to being imaged and, if the preview image is found to contain some image portion that corresponds to information that is considered not subject to being imaged, disable the image sensor from capturing an image that would contain the image portion containing the scene.

12. The system as in claim 8, where execution of the software instructions by the at least one data processor further causes the system to analyze the preview image by accessing a data storage that contains representations of information that is considered not subject to being imaged for comparison with image features extracted from the preview image, where the data storage is at least one of:
  contained in a device that also contains the image sensor, or
  is located remotely from the device and is accessed via a wireless connection.

13. The system as in claim 8, where the system is embodied in a mobile user device that comprises at least a camera.

14. A computer program product comprised of software instructions on a computer-readable medium, where execution of the software instructions using a computer results in performing operations comprising:
  actuating an image capture process for an image;
  displaying a preview image, made by an image sensor when operating in a preview image mode, based on the actuated image capture process;
  analyzing the displayed preview image to determine if the displayed preview image comprises some portion that corresponds to information that is considered not subject to being imaged; and
  if it is determined that the displayed preview image does comprise some image portion that corresponds to information that is considered not subject to being imaged, disabling the image sensor from capturing an image that would correspond to the displayed preview image;
  wherein analyzing the displayed preview image is based at least in part on a detection of a motion of the image sensor and includes extracting, mapping, and scaling the preview image to determine a gradient distribution.

15. The computer program product as in claim 14, where the image portion comprises text, further comprising identifying a text region in the preview image, extracting textual characters from the text region, performing text recognition on the extracted textual characters, performing key word/phrase comparisons on recognized text to find a match, if present, to a predetermined list of words/phrases that are deemed to not be subject to being imaged and, if the preview image is found to contain some image portion that corresponds to information that is considered not subject to being imaged, disabling the image sensor from capturing an image that would contain the image portion containing text.

16. The computer program product as in claim 14, where the image portion comprises a graphical pattern, further comprising identifying a region in the preview image that contains the graphical pattern, extracting the graphical pattern from the region, performing graphical comparisons on the extracted graphical pattern to find a match, if present, to a predetermined set of graphical patterns that are deemed to not be subject to being imaged and, if the preview image is found to contain some image portion that corresponds to information that is considered not subject to being imaged, disabling the image sensor from capturing an image that would contain the image portion containing the graphical pattern.

17. The computer program product as in claim 14, where the image portion comprises a scene, further comprising identifying a region in the preview image that contains the scene, extracting the scene from the region, performing scene comparisons on the extracted scene to find a match, if present, to a predetermined set of scenes that are deemed to not be subject to being imaged and, if the preview image is found to contain some image portion that corresponds to information that is considered not subject to being imaged, disabling the image sensor from capturing an image that would contain the image portion containing the scene.

18. The computer program product as in claim 14, where analyzing comprises accessing a data storage that contains representations of information that is considered not subject to being imaged for comparison with image features extracted from the preview image, where the data storage is at least one of:
contained in a device that also contains the image sensor, or
is located remotely from the device and is accessed via a wireless connection.

19. The computer program product as in claim 14, where the computer-readable medium and the computer comprise a part of a mobile user device that also comprises at least a camera containing the image sensor.

20. The computer program product as in claim 14, where analyzing comprises accessing a data storage that contains representations of information that is considered not subject to being imaged for comparison with image features extracted from the preview image, where the data storage is associated with an enterprise/organization and at least some of the representations of information are specific to the enterprise/organization, where the computer-readable medium and the computer comprise a part of a mobile user device that also comprises at least a camera containing the image sensor, and where the data storage is wirelessly accessed by the mobile user device for comparison with image features extracted from the preview image when the mobile user device is in the physical vicinity of the enterprise/organization.

* * * * *